United States Patent [19]

Chambers

[11] Patent Number: 4,495,533
[45] Date of Patent: Jan. 22, 1985

[54] DISK MEMORY INDEXING SYSTEM

[75] Inventor: Aaron L. Chambers, Woodside, Calif.

[73] Assignee: Atasi Corporation, San Jose, Calif.

[21] Appl. No.: 392,504

[22] Filed: Jun. 28, 1982

[51] Int. Cl.³ .................. G11B 27/32; G11B 27/36; G11B 31/00

[52] U.S. Cl. .................. 360/72.2; 360/75; 360/135; 369/33; 369/36

[58] Field of Search .................. 360/72.2, 75, 77, 78, 360/135; 369/30, 33, 34, 36, 41, 52

[56] References Cited

U.S. PATENT DOCUMENTS 4,120,008 10/1978 Metzger et al. .................. 360/70
4,346,413 8/1982 Hack .................. 360/77

Primary Examiner—George G. Stellar
Attorney, Agent, or Firm—Alan H. MacPherson; Steven F. Caserza; Richard Franklin

[57] ABSTRACT

In accordance with one embodiment of this invention, the second pulse P2 of pulse pair P1, P2 on a disk memory servo track is used as the optional pulse which conveys information relating to the status of the track. In this manner, the possibility of erroneous data being read due to variations in the speed of rotation of the disk is substantially minimized as compared with prior art systems. Furthermore, in accordance with one embodiment of this invention, the determination of whether the servo track pulses comprise the pulse pair P1, P2 or other pulses, as well as analysis of the data from a plurality of pulse pairs P1, P2, is performed by a simple and inexpensive hardware circuit which is capable of utilizing a simple, inexpensive yet highly reliable fixed frequency clock in place of the rather expensive phase lock loop circuit typically used in the prior art.

In accordance with another embodiment of this invention, a unique clocking circuit is utilized wherein selected clock pulses provided by the clock generator are selectively delayed as required in order to synchronize the clock pulses with data being read from the servo track. In this manner, the clock remains synchronized with the servo track data even during periods when the speed of rotation of the servo disk fluctuates.

9 Claims, 12 Drawing Figures

| PIN SOURCE | | | | | | COMPARATOR ENABLE | PIN FUNCTION | | | | | | |
|---|---|---|---|---|---|---|---|---|---|---|---|---|---|
| Q4 | Q3 | Q2 | Q1 | Q0 | | | LC | LB | LA | W4N | W3N | W2N | W1N |
| INPUTS | | | | | IN | | OUTPUTS | | | | | | |
| 14 | 13 | 12 | 11 | 10 | HEX CODE | 9 | 7 | 6 | 5 | 4 | 3 | 2 | 1 |
| 0 | 0 | 0 | 0 | 0 | 00 | 0 | 1 | 1 | 0 | 1 | 1 | 1 | 1 |
| 0 | 0 | 0 | 0 | 1 | 01 | 0 | 1 | 1 | 0 | 1 | 1 | 1 | 1 |
| 0 | 0 | 0 | 1 | 0 | 02 | 0 | 1 | 1 | 0 | 1 | 1 | 1 | 1 |
| 0 | 0 | 0 | 1 | 1 | 03 | 0 | 1 | 1 | 0 | 1 | 1 | 1 | 1 |
| 0 | 0 | 1 | 0 | 0 | 04 | 0 | 1 | 1 | 0 | 1 | 1 | 1 | 1 |
| 0 | 0 | 1 | 0 | 1 | 05 | 0 | 1 | 1 | 0 | 1 | 1 | 1 | 1 |
| 0 | 0 | 1 | 1 | 0 | 06 | 0 | 1 | 1 | 0 | 1 | 1 | 1 | 1 |
| 0 | 0 | 1 | 1 | 1 | 07 | 0 | 1 | 1 | 0 | 1 | 1 | 1 | 1 |
| 0 | 1 | 0 | 0 | 0 | 08 | 0 | 1 | 1 | 0 | 1 | 1 | 1 | 1 |
| 0 | 1 | 0 | 0 | 1 | 09 | 0 | 1 | 1 | 0 | 1 | 1 | 1 | 1 |
| 0 | 1 | 0 | 1 | 0 | 0A | 0 | 0 | 0 | 0 | 1 | 1 | 1 | 0 |
| 0 | 1 | 0 | 1 | 1 | 0B | 0 | 0 | 1 | 0 | 1 | 1 | 1 | 1 |
| 0 | 1 | 1 | 0 | 0 | 0C | 0 | 0 | 0 | 0 | 1 | 1 | 1 | 1 |
| 0 | 1 | 1 | 0 | 1 | 0D | 1 | 1 | 1 | 1 | 1 | 1 | 1 | 1 |
| 0 | 1 | 1 | 1 | 0 | 0E | 0 | 0 | 0 | 1 | 1 | 1 | 1 | 1 |
| 0 | 1 | 1 | 1 | 1 | 0F | 1 | 0 | 0 | 0 | 1 | 1 | 1 | 1 |
| 1 | 0 | 0 | 0 | 0 | 10 | 0 | 1 | 1 | 1 | 1 | 1 | 1 | 1 |
| 1 | 0 | 0 | 0 | 1 | 11 | 0 | 0 | 1 | 0 | 0 | 1 | 1 | 1 |
| 1 | 0 | 0 | 1 | 0 | 12 | 0 | 0 | 0 | 0 | 0 | 1 | 1 | 1 |
| 1 | 0 | 0 | 1 | 1 | 13 | 0 | 0 | 1 | 0 | 1 | 1 | 1 | 1 |
| 1 | 0 | 1 | 0 | 0 | 14 | 0 | 0 | 0 | 0 | 1 | 0 | 1 | 1 |
| 1 | 0 | 1 | 0 | 1 | 15 | 0 | 0 | 0 | 0 | 1 | 0 | 1 | 1 |
| 1 | 0 | 1 | 1 | 0 | 16 | 0 | 0 | 1 | 0 | 1 | 1 | 1 | 1 |
| 1 | 0 | 1 | 1 | 1 | 17 | 0 | 0 | 1 | 0 | 1 | 1 | 0 | 1 |
| 1 | 1 | 0 | 0 | 0 | 18 | 0 | 0 | 0 | 0 | 1 | 1 | 0 | 1 |
| 1 | 1 | 0 | 0 | 1 | 19 | 0 | 0 | 1 | 0 | 1 | 1 | 1 | 1 |
| 1 | 1 | 0 | 1 | 0 | 1A | 0 | 0 | 1 | 0 | 1 | 1 | 1 | 0 |
| 1 | 1 | 0 | 1 | 1 | 1B | 0 | 0 | 0 | 0 | 1 | 1 | 1 | 0 |
| 1 | 1 | 1 | 0 | 0 | 1C | 0 | 0 | 0 | 0 | 1 | 1 | 1 | 1 |
| 1 | 1 | 1 | 0 | 1 | 1D | 1 | 0 | 0 | 0 | 1 | 1 | 1 | 1 |
| 1 | 1 | 1 | 1 | 0 | 1E | 0 | 0 | 1 | 1 | 1 | 1 | 1 | 1 |
| 1 | 1 | 1 | 1 | 1 | 1F | 1 | 0 | 0 | 0 | 1 | 1 | 1 | 1 |

DISK MEMORY INDEXING SYSTEM

BACKGROUND OF THE INVENTION

1. Field of the Invention

This invention relates to disk memory apparatus for storing information and in particular to a structure and method for decoding information stored on a servo disk which characterizes the type of track being read and its rotational position.

2. Description of the Prior Art

Prior art disk based memory structures are well known. One such prior art disk memory system is shown in FIG. 1. Disk memory system 70 comprises a plurality of disks 99, 100 and 101 (although a disk memory system may contain fewer or more than three disks) and a drive motor 117 which causes disks 99, 100 and 101 to rotate counterclockwise at a high speed as shown by the arrow in FIG. 1. Disk memory system 70 also includes a plurality of sensing elements or "heads" 120a-120f. One such head is utilized for each surface of each disk. Thus, for the system of FIG. 1 which utilizes three disks 99, 100 and 101, a plurality of six heads (indicated by the six dots 120a-120f) are required to monitor or "read" data stored on the six disk surfaces. As shown in FIG. 1, two heads are often located on the same physical support element; thus the two center elements each contain two heads 120b, 120c and 120d, 120e. The heads 120a-120f are moved in a lateral direction radially across disks 99, 100 and 101 in order to access (i.e. "read" or "write") at any given time information stored on a selected one of the plurality of substantially circular annular tracks on which information is stored on each surface of disks 99, 100 and 101. Such disk access operations are hereinafter referred to as "read" operations, although it is to be understood that data may be either read from or written to the disk during such operations. This lateral movement is controlled by Servo Motor 119 in a well known manner. The speed of disk drive motor 117 is typically controlled by a well known type of motor speed controller which holds the speed of rotation of disks 99, 100 and 101 to within about one percent of its desired speed.

While the disk memory system 70 in FIG. 1 includes three disks 99, 100 and 101, or a total of six disk surfaces (labelled 99a, 99b, 100a, 100b, 101a and 101b), only five of these disk surfaces (surfaces 99a, 99b, 100a, 100b, 101a) are available for use in storing actual data or information for processing. The remaining disk surface 101b is known as the "servo-disk surface" and permanently stores information relating to the location of tracks on the other five surfaces of the disks. Of importance, the location of tracks on the servo disk surface 101b is substantially identical to the location of tracks on the remaining disk surfaces. Thus, when the servo head 120f is correctly positioned on a selected track of the servo disk surface 101b, the heads 120a to 120e are also correctly positioned to read data from corresponding tracks on the remaining disk surfaces 99a, 99b, 100a, 100b and 101a. In this manner, one disk head 120f monitors the servo-disk surface in order to determine whether the heads 120a to 120e are correctly positioned laterally along the radii of the disks. The disk head 120f associated with the servodisk surface 101b also reads information from the servo-disk surface 101b in order to determine where along the circular path of the track the head is located. The disk head 120f also reads information stored on the servo-disk surface 101b to determine whether the track being read is the zero track (i.e. corresponding the first track used for storing information on disk surfaces 99a, 99b, 100a, 100b, 101a) or whether the track being read is a "Guard Band Track", corresponding to one of the unusable tracks along the inner regions or outer regions of the other disk surfaces 99a, 99b, 100a, 100b, 101a.

A plan view of the servo-disk surface 101b is shown in FIG. 2. Circular opening 17 is used for mounting the disk 101 on a spindle which is driven by disk drive motor 117 (FIG. 1). Track 18 is one of a number of "guard band" tracks located along the inner portion of disk surface 101b. Similarly, track 19 is one of a number of "guard band" tracks located near the outer portion of disk surface 101b. These guard band tracks contain information indicating that corresponding tracks on the other disk surfaces 99a, 99b, 100a, 100b, 101a are not used for storing information. The track immediately adjacent to guard band 19 toward the center of disk surface 101b is called the "zero" track, and is used as a starting point for counting the tracks as the heads 120a to 120f are moving radially across the disks. For example, upon power-up of the disk memory system 70 (FIG. 1) and the receipt of a read or write instruction, the head 120f will first locate the zero track on the servo-disk surface 101b and, in response to computer instructions, will locate a first selected track to be read as control circuitry and actuator motor 119 move the heads 120 inward in a lateral direction the required number of tracks (as determined by the servo head 120f and related control circuitry). From this position above the first selected track to be read, the heads 120a-120f will either move radially inward or outward a second selected number of tracks in order to position themselves above a second selected track to be read. This method of locating a track by moving heads 120a-120f inward or outward a desired number of tracks from their last known position is often referred to as "dead reckoning". Should an error be detected (as will be more fully described later) or upon other computer instruction, the heads 120a-120f will again locate the zero track and begin this dead reckoning process anew.

As shown in FIG. 2, a radius line I₁ serves as an index for the starting point of each annular track. In this manner, the data stream which is read from each track as disks 99, 100 and 101 rotate is synchronized upon receipt of a signal defining the location of the index position I₁ on servo track 101b.

In order for the head 120f associated with the servo-disk to be able to provide information to enable the computer to determine whether the servo track being read is a guard band track, the zero track, or a track other than the zero track which is capable of storing information, as well as the index position on the servo disk surface 101b, each track within servo-disk surface 101b must contain digital information regarding the status of the track. This information is stored in the form of a sequence of magnetized and nonmagnetized portions of the track representing binary digits (bits) which are detected by head 120f and converted by head 120f to a sequence of analog pulses as the disk 101 rotates. Such a pulse stream from a servo track is shown in FIG. 3a. Because the annular tracks on servo disk surface 101b are continuous, the pulse streams will be repeated as the disks rotate. The number of pulses provided by a single track of the servo-disk is quite large, typically numbering approximately sixteen thousand. For clarity, only a relatively few of these pulses are shown in FIG. 3a.

The bit stream from a selected servo track on servo disk surface 101b shown in FIG. 3a is broken up into a plurality of segments of time duration T4. Each of these segments provides the possibility for storage in the track of six pulses. Pulses P1 and P2 indicate the beginning of each time period such as time period T4 and provide data defining whether the track is a guard band track or the zero track. Window pulses W1 through W4 are analog pulses which indicate whether the track is an odd numbered track or even numbered track, and are used in order to cause each of heads 120a through 120f to properly align itself along the track in a well known manner. By determining whether the track being read is an odd numbered or even numbered track and comparing this with the desired track number (odd or even), errors in track selection are minimized.

As previously described, the pulses P1 and P2 indicate the start of time period T4 and the presence or absence of pulse P2 provides one of a plurality of bits which define the track as either a guard band track or the zero track, and the location of index position $I_1$. Accordingly, pulses P1 and P2 are closely spaced in order to be easily recognizable as pulses P1 and P2 and not confused with window pulses W1 through W4. Thus, the minimum spacing T5 between the rising edge of any pulse other than pulse P1 and any adjacent pulse must be greater than the maximum time spacing T1 between the rising edge of pulse P1 and pulse P2. If it is determined that, within a time period T1 after the rising edge of a pulse, a second pulse is located, the first pulse was pulse P1 and the second pulse is P2 because only pulses P1 and P2 are located so closely, and synchronization is established. On the contrary, if after the rising edge of a first pulse, a second pulse is not located within the time T1, synchronization is not established because it is not certain that the first pulse was a pulse P1 (i.e. the first pulse may be pulse P1 and pulse P2 is missing, or the first pulse was not pulse P1).

In prior art disk memory systems, the first pulse P1 is a so-called "optional" pulse in that its presence or absence provides one bit of data relating to the status of the track as a guard band track or the zero track. Naturally, although pulses P1 are optional, a sufficient number of pulses P1 are present to enable the disk memory system to synchronize its operation such that the memory system knows during what time periods the optional pulse P1 is (or is not) located and also knows the location of pulse P2, and pulses W1 through W4. In this manner, a plurality (typically eight) of pulses P1 from an equal plurality of adjacent time periods T4 provide an equal plurality of bits of information which define the status of the track as a guard band track or the zero track, as well as defining the index position. Of importance, oftentimes it is provided that no two sequential optional pulses P1 are both absent, thus allowing synchronization to be established upon locating at most two sequential pulse pairs, because at least one of the two sequential pulse pairs will contain both optional pulse P1 and pulse P2.

In such prior art systems, a time period equal to the time between the rising edge of pulse P2 and the location of the subsequent optional pulse P1 (i.e., T4-T2-T3) must elapse before the data from the subsequent pulse P1 is received. Accordingly, if the speed of rotation of disk 101 varies, thus causing each of the time periods T1 through T5 shown in FIG. 3a to vary, there is the possibility that the optional pulse P1 will not be read at the expected time after pulse P2, with the result that the disk drive system will read data erroneously from the track (either a noise pulse will be read as the presence of a pulse P1, or the presence of a pulse P1 will go undetected) with the concommitment disadvantage that the track will be erroneously identified, the index position erroneously identified, and that subsequent reading of data from this and other tracks (i.e. tracks on disk surfaces 99a, 99b, 100a, 100b, 101a) located by the dead reckoning technique will provide erroneous data in that the wrong tracks are read, and the bit stream read from each track is synchronized to an erroneous index position. Alternatively, reading data erroneously from the servo disk surface 101b is detected by the disk system and additional, time consuming attempts to read valid data are made, thus decreasing system speed. If valid data cannot be read after several attempts, the disk drive system ceases to function.

In such prior art systems, a variation in the speed of rotation of the disks of as little 0.5% may cause such errors. To alleviate this problem, such prior art disk systems utilize complex and expensive circuitry for increasing the tolerance to disk speed variations. Such prior art circuitry typically includes a phase lock loop circuit for generating clock signals which are accurately synchronized with the disk rotation. Another technique for increasing the tolerance to disk speed variations is to search for a pulse P1 during a rather wide time interval at a specified time after detection of a pulse P2. However, this technique increases the system's susceptibility to noise which may be present during the specified time interval, as compared to systems in which the data output of the servo track being read is momentarily strobed a specified time after a pulse P2 is located.

SUMMARY

In accordance with one embodiment of this invention, the second pulse P2 of the pulse pair P1, P2 is used as the optional pulse which conveys information relating to the status of the track. In this manner, the possibility of erroneous data being read due to variations in the speed of rotation of the disk is substantially minimized as compared with prior art systems, in that the time delay between the optional pulse P2 and the last known pulse P1 of the pulse pair P1, P2 is significantly reduced as compared to prior art systems which utilize pulse P1 as the optional pulse. Thus, for a given change in the speed of rotation of the disk 101, the change in the time period between a pulse P1 and its associated optional, data carrying pulse P2, as taught by this invention, is substantially less than the change in the time period between a pulse P2 and its associated optional, data carrying pulse P1 of the subsequent pulse pair, as in the prior art. Thus, according to the teachings of this invention, where pulse P2 is used as the optional pulse, the location of a pulse P2 is more precisely defined over a larger variation in the speed of rotation of disk 101, as compared to the prior art.

Furthermore, in accordance with one embodiment of this invention, the determination of whether the pulses read by head 120f comprise the pulse pair P1, P2 or window pulses W1 through W4, as well as analysis of the data from a plurality of pulse pairs P1, P2, and thus determination of the status of the track as either a guard band or the zero track and location of the Index position $I_1$, is performed by a simple and inexpensive hardware circuit which, due to the increased tolerance of this circuit (as compared with prior art circuits) to variations in the rotational speed of the disk, is capable of utilizing a simple, inexpensive yet highly reliable fixed frequency clock in place of the rather expensive phase lock loop circuit typically used in the prior art.

In accordance with another embodiment of this invention, a unique clocking circuit is utilized wherein selected clock pulses provided by the clock generator are selectively delayed as required in order to synchronize the clock pulses with data being read from the servo track. In this manner, the clock remains synchronized with the servo track data even during periods when the speed of rotation of the servo-disk fluctuates.

BRIEF DESCRIPTION OF THE DRAWINGS

FIG. 9 is a programming chart for a programmable read only memory used in one embodiment of this invention.

DETAILED DESCRIPTION

Figure 3A:
FIG. 3a is a timing diagram depicting a typical prior art pulse stream received from a servo-track of a servo-disk.
Figure 3B:
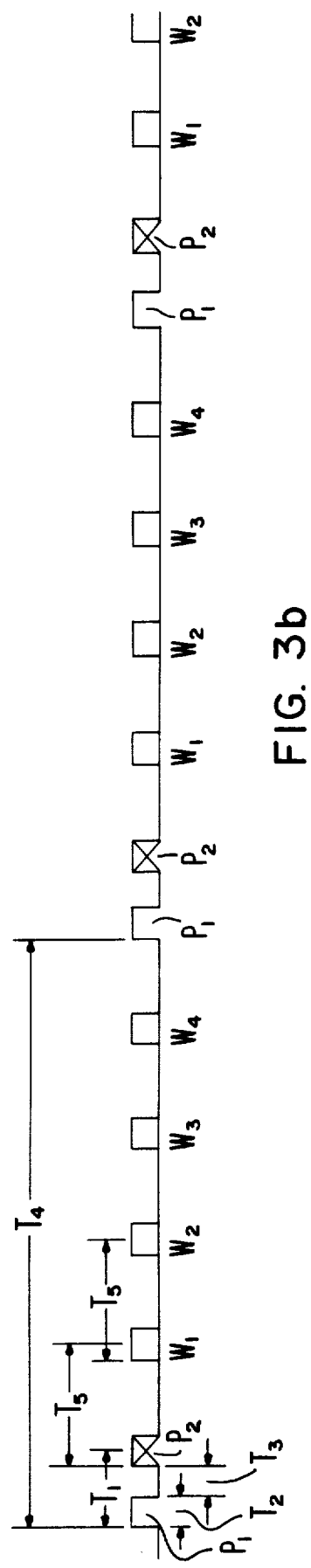
FIG. 3b is a timing diagram depicting the pulse stream received from a servo-track of a servo-disk constructed in accordance with one embodiment of this invention.

As shown in FIG. 3b, in accordance with one embodiment of this invention, the second pulse P2 of the pulse pair P1, P2 is used as the optional pulse which conveys data regarding the status of the track as either a guard band track or the zero track, as well as the location of Index position $I_1$. As in the prior art bit stream of FIG. 3a, the pulses of pulse pair P1, P2 are closely spaced such that the minimum time spacing T5 between the rising edge of any pulse other than P1 and any adjacent pulse is greater than the maximum time spacing T1 between the rising edge of pulse P1 and pulse P2, in order to recognize closely spaced pulses as pulses P1 and P2. In one embodiment of this invention, $T_1 = 850$ nanoseconds, $T_2 = 250$ nanoseconds, $T_4 = 6400$ nanoseconds, and $T_5 = 1000$ nanoseconds.

Figure 4:
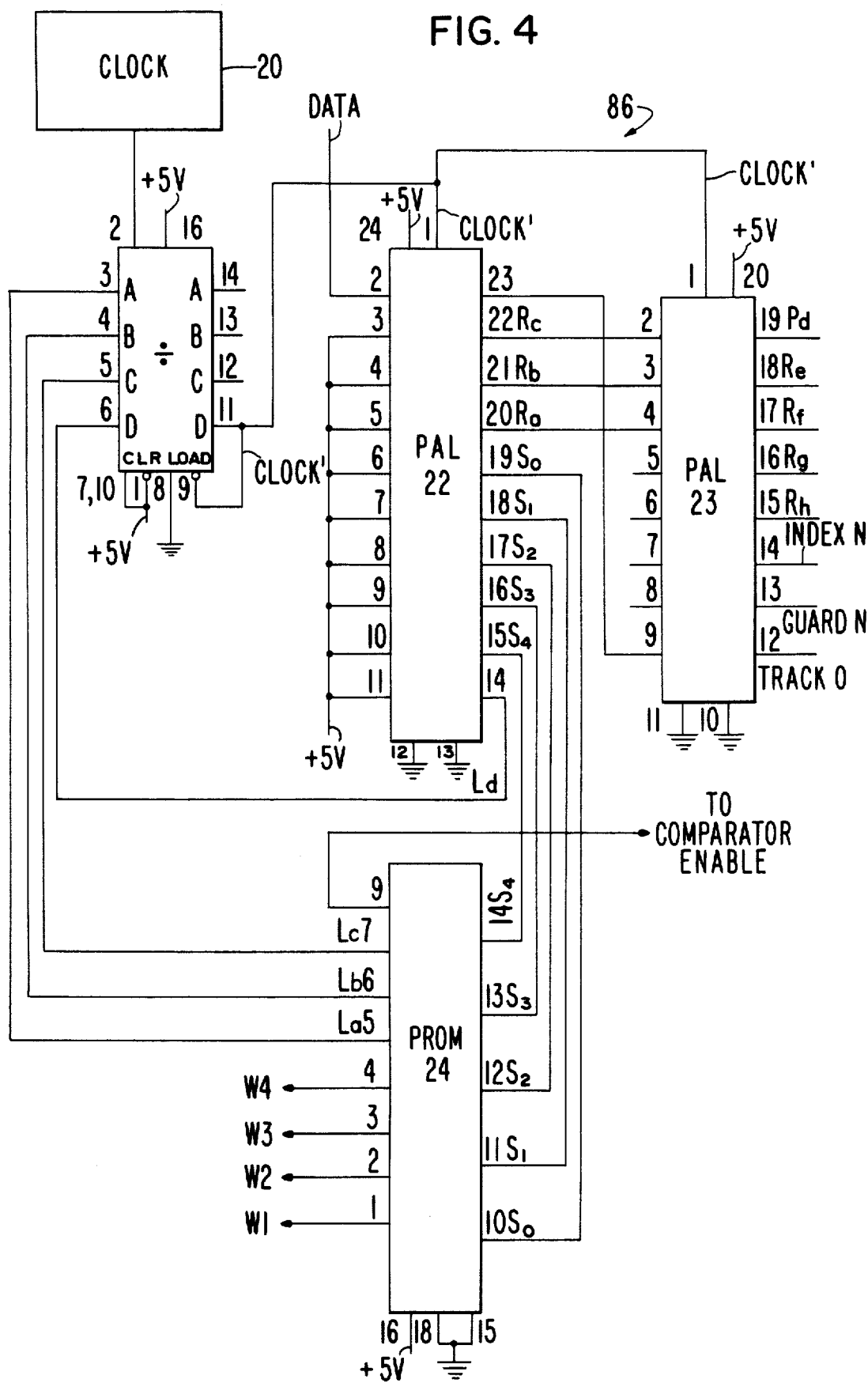
FIG. 4 is a schematic diagram of one circuit constructed in accordance with this invention which is useful for decoding the data received from a servo-track.

A schematic diagram of one embodiment of a circuit for analyzing the data received from the servo-disk is shown in FIG. 4.

Detection circuit 86 receives the pulse stream which is read from the selected track of the servo disk surface 101b (FIG. 1) and synchronizes its operation by locating the pulse pairs P1, P2 within the pulse stream. Detection circuit 86 also provides signals W1-W4 which indicate the location within the pulse stream of window pulses W1-W4, respectively. Detection circuit 86 also stores a plurality of bits provided by the presence or absence of an equal plurality of pulses P2 and decodes this plurality of bits to provide output signals indicating if the track being read is a guardband track or the zero track, as well as a signal indicating when the index position $I_1$ (FIG. 2) of track 101b is positioned over head 120f.

Clock 20 is typically a crystal controlled clock having a frequency of 20 Megahertz and is of a type well known in the art. With a clock frequency of 20 MHz clock 20 provides a substantially squarewave output pulse stream having a clock period of 50 nanoseconds. This clock signal is applied to the input lead of divider 21, which in one embodiment of this invention comprises a 74S163 device manufactured by Texas Instruments. The 74S163 device comprises a pre-settable divide by 16 counter. Thus, in operation divider 21 has its count preset by the bits $L_a$ through $L_d$ on input leads $L_a$ through $L_d$, respectively, (which will be more fully described later) and from this count increments its count by one upon each clock cycle from clock 20. Of importance, the presetting of counter 21 requires a single clock cycle and thus, when the divider 21 is preset to a value N, where N is an integer between zero and 15, divider 21 requires a total of $(16 - N + 1)$ counts in order to increase its count from the preset value, through 1111 and ending its count at 0000. Thus counter 21 is capable of providing an output CLOCK' signal having a selected period between 100 nanoseconds to 800 nanoseconds, as desired. In one embodiment of this invention, output CLOCK' signals are provided every 100, 150, 200, 250, 300, 350, 400, 450 nanoseconds as defined by the bits $L_a$, $L_b$, $L_c$ and $L_d$ in accordance with the following table:

TABLE I

| Clock 20 period = 50 nanoseconds (ns) | | | | |
|---|---|---|---|---|
| Binary Preset Value | | | | |
| $L_d$ | $L_c$ | $L_b$ | $L_a$ | CLOCK' Period |
| 1 | 0 | 0 | 0 | 450 ns |
| 1 | 0 | 0 | 1 | 400 ns |
| 1 | 0 | 1 | 0 | 350 ns |
| 1 | 0 | 1 | 1 | 300 ns |
| 1 | 1 | 0 | 0 | 250 ns |
| 1 | 1 | 0 | 1 | 200 ns |
| 1 | 1 | 1 | 0 | 150 ns |
| 1 | 1 | 1 | 1 | 100 ns |

One clock 20 period after divider 21 increases its count from the preset value to 1111, divider 21 resets its value to 0000. On the transition of the divider 21 count from 1111 to 0000, the D output lead of divider 21 provides a low CLOCK' signal, which is connected to the divider 21 LOAD input lead. This low LOAD input signal causes divider 21 to load the next binary preset value defined by the bits $L_a$ through $L_d$. A logical zero preset value of bit $L_d$ (provided by programmable array logic element 22 as will be more fully described later)

causes the D output signal from divider 21 to be low, thus causing divider 21 to continue loading preset data and thus preventing divider 21 from counting. In this manner, when the $L_d$ bit from PAL 22 is low, divider 22 is effectively disabled and CLOCK' signals are not provided to PALs 22 and 23. Conversely, if the $L_d$ preset bit is a logical one, the divider 21 will function as previously described, generating a CLOCK' signal having a period as defined in Table I.

Figure 7:
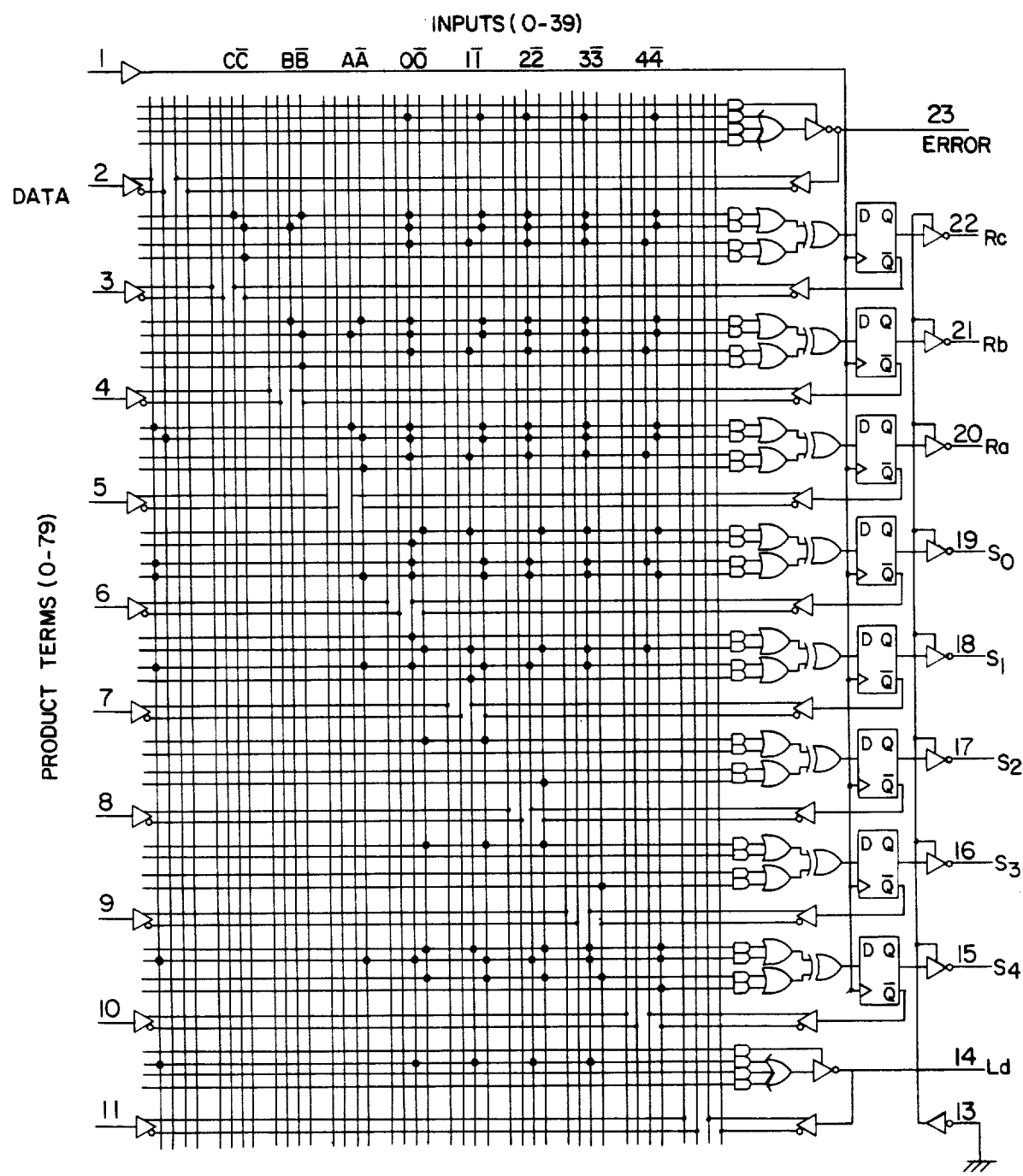
FIG. 7 is a programming diagram for one programmable array logic element used in one embodiment of this invention.
Figure 8:
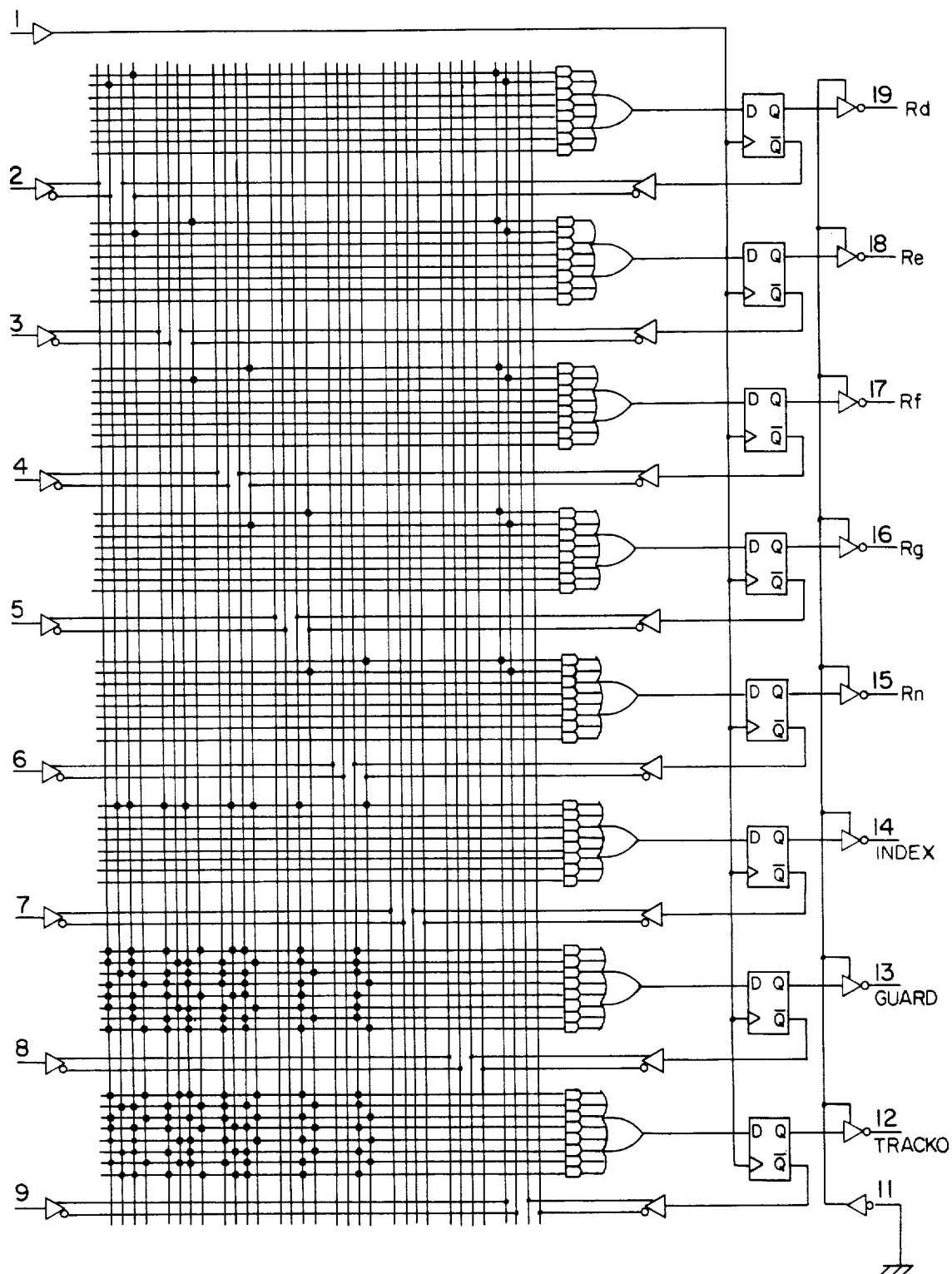
FIG. 8 is a programming diagram for another programmable array logic element used in one embodiment of this invention.

The CLOCK' signal is also applied to the clock input leads of Programmable Array Logic (PAL) elements 22 and 23, thus causing PAL 22 to receive a DATA input signal from the servo-track being read when the CLOCK' signal is high. In one embodiment of this invention, PAL 22 is a 20X8 device and PAL 23 is a 16R8 device, both manufactured by Monolithic Memories Inc. The programming configurations for PAL 22 and PAL 23 used in conjunction with one embodiment of the invention are shown in FIGS. 7 and 8, respectively. PAL 23 determines the correct state (i.e., whether the servo track being read is the zero track, a guard band track, and whether the Index position $I_1$ is positioned at head 120f) based upon the data just received from the servo-track and the previous state as determined by PAL 22.

In accordance with one embodiment of this invention, a total of 32 states are possible, each state defining one of the 32 steps of the algorithm used to decode the pulses received from the servo track being read, as will be more fully described later with reference to FIG. 5. The appropriate one of the 32 possible states are defined by the output bits S0 through S4 from PAL 22 which are in turn applied to the address input leads of Programmable Read Only Memory (PROM) 24. In one embodiment of this invention, PROM 24 comprises a 74S288 device manufactured by National Semiconductor Corporation and the programming of PROM 24 is shown in FIG. 9. Based upon the state defined by output bits S0 through S4 from PAL 22, the appropriate pre-programmed 8-bit word within PROM 24 is selected. Three bits of the selected 8-bit word (bits $L_a$, $L_b$, and $L_c$) are provided to divider 21 and serve to preset the three least significant bits of divider 21. The most significant bit of divider 21 is preset by the $L_d$ output bit from PAL 22, as previously described. Four other output bits (W1-W4) provided by PROM 24 serve to indicate when each window pulse W1-W4, respectively (FIG. 3b), are expected to be present in the pulse stream from head 120f. The remaining output bit provided by PROM 24 serves to enable an input comparator (not shown), thus allowing PAL 22 to receive pulse stream data.

In accordance with FIGS. 7 and 8, PALs 22 and 23 are configured so as to together form an 8-bit shift register providing output bits $R_a$ through $R_h$ which define the data contents of the previous 8 optional bits P2 of the previous 8 time periods T4 (FIG. 3b). These 8 bits define the status of the track as either a guard band track or the zero track, as well as determining when the Index position $I_1$ is located above head 120f as the servo-disk 101 rotates. PAL 23 in turn utilizes these bits $R_a$ through $R_h$ and determines whether a specific 8-bit code is present. If so, PAL 23 turns on (a logical zero) the appropriate output signals TRACK0, GUARDN, INDEXN. A low TRACK0 signal signifies that the track being read is the zero track. Similarly, a low GUARDN signifies that the track being read is a guard band track. A low INDEXN signal indicates that the index position $I_1$ (FIG. 2) is located above head 120f. Accordingly, the INDEXN lead 14 goes low once with each revolution of the disk 101.

As previously described, PAL 22 is capable of defining 32 possible states (states 0-31). Because only 24 states (states 0-21) are required to implement this embodiment of my invention, the unused states (states 21-31) cause PROM 24 to provide output data which causes the decoding circuit 86 to quickly enter state 0. In this manner, if an unused state is selected on power-up of decoding circuit 86, circuit 86 will quickly reset to state 0 and begin its operation. Of importance, in this embodiment, it is impossible to enter an unused state other than by chance on power up.

Figure 1:
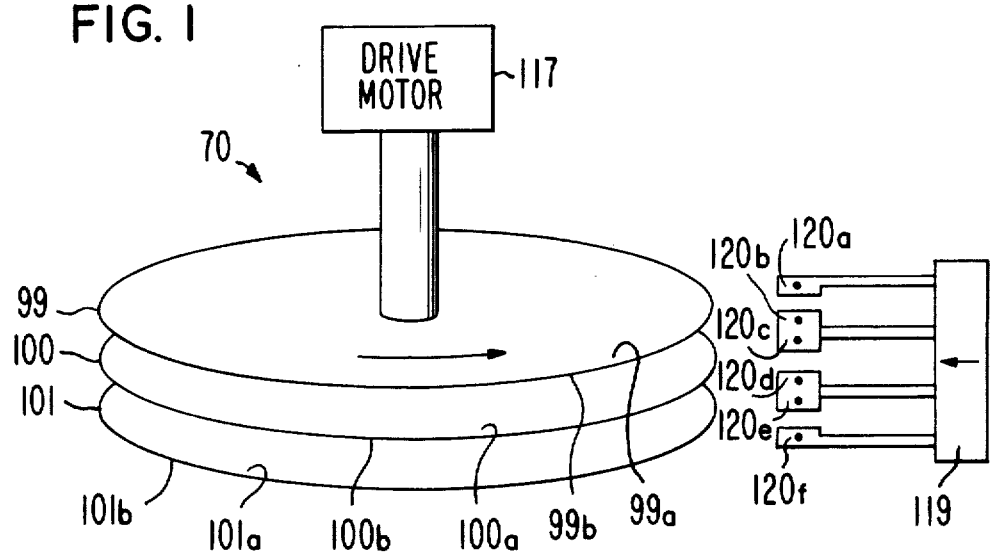
FIG. 1 depicts a typical prior art disk memory system.
Figure 2:
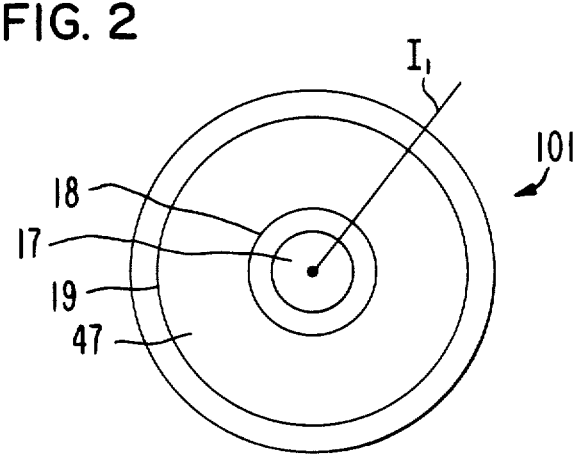
FIG. 2 is a top view of a typical servo disk surface depicting the location of various components thereof.
Figure 5:
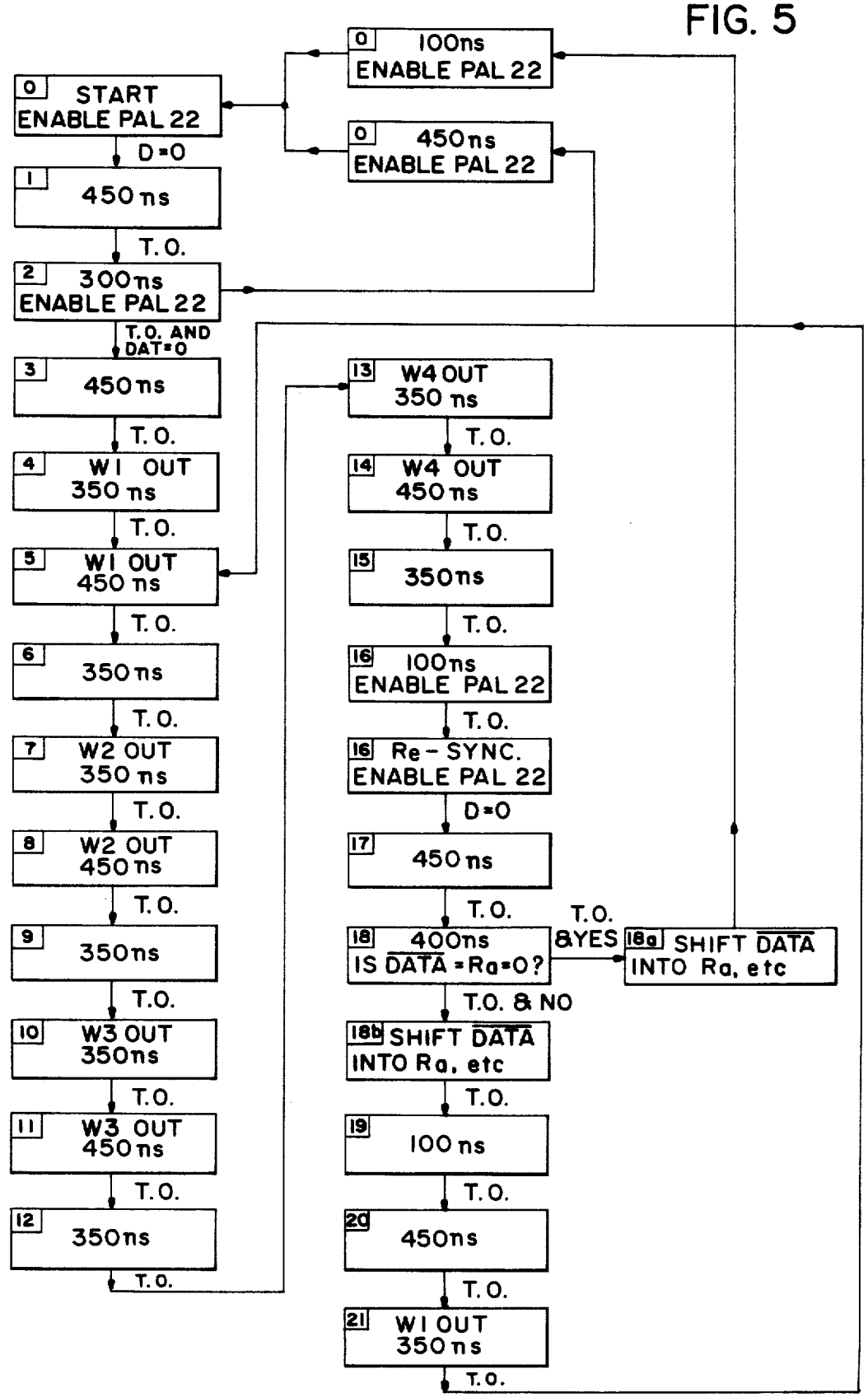
FIG. 5 is a flow chart depicting the operation of one embodiment of this invention.
Figure 10:
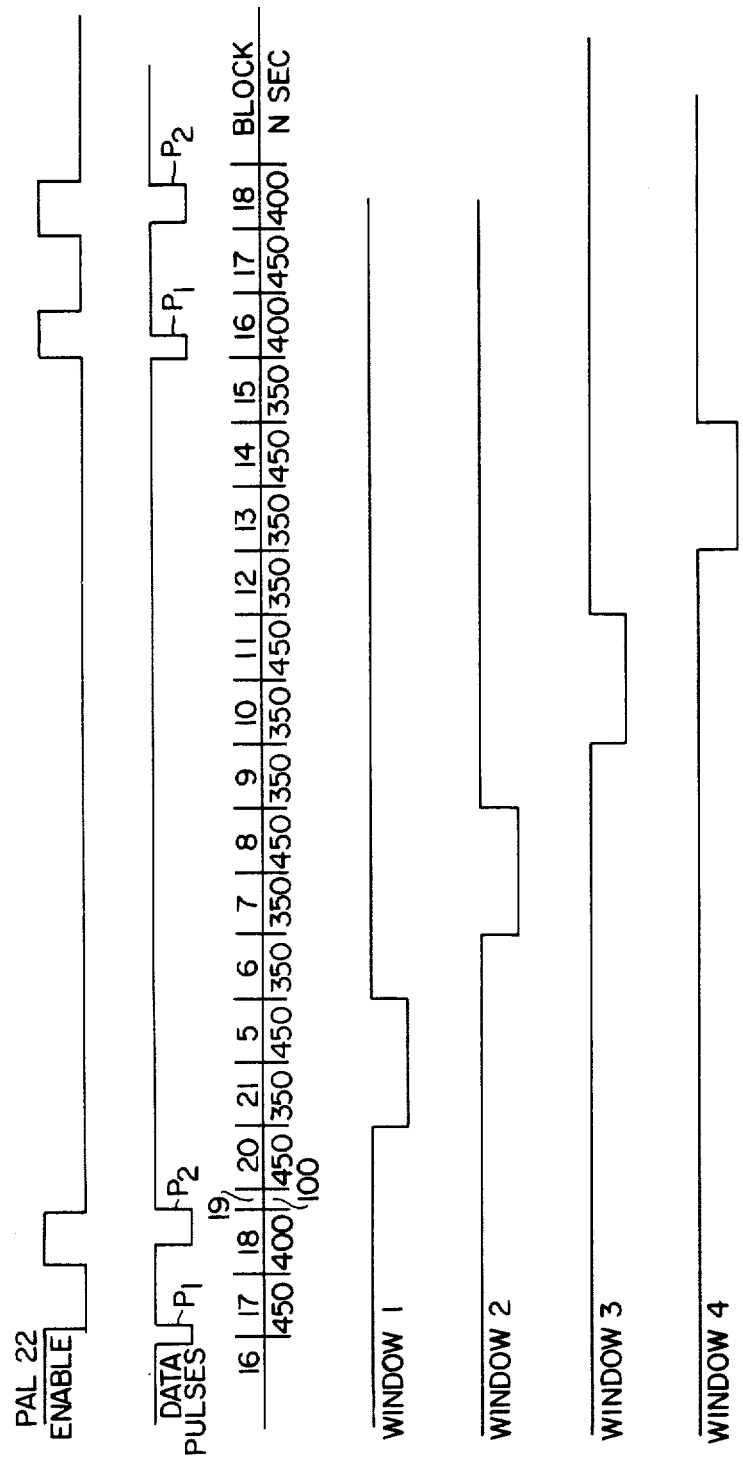
FIG. 10 is a timing chart depicting operation of one embodiment of this invention.

A flow chart depicting the operation of one circuit constructed in accordance with this invention is shown in FIG. 5. The following discussion is keyed to the numbered blocks of FIG. 5, the schematic diagram of FIG. 4, and the timing diagram of FIG. 10. The numbered blocks of FIGS. 5 and 10 correspond to the state numbers provided by PAL 22. As shown in block 0, at the start of the routine PAL 22 is enabled to receive pulse stream data input from the disk head 120f (FIG. 1). When this pulse stream data input goes low (DATA=0) indicating the detection of a pulse on the servo track being read (which may or may not be pulse P1), block 1 is executed. PAL 22 simultaneously provides a high (logical one) $L_d$ bit to divider 21 and address bits S0 through S4 to PROM 24. Address bits S0 through S4 in turn cause PROM 24 to provide the appropriate bits $L_a$ through $L_c$ in order to cause divider 21 to provide a 450 nanosecond delay before providing a high to low transition of the CLOCK' signal, as shown in block 1. On receipt of this high to low transition of the CLOCK' signal (i.e. CLOCK' has "Timedout", as indicated by the letters "T.0." on the flow chart of FIG. 5), block 2 is entered and PAL 22 and PROM 24 provide appropriate $L_a$ through $L_d$ preset bits thus causing divider 21 to provide a 300 nanosecond CLOCK' signal, and PAL 22 is enabled to receive pulse data from the servo disk. If the DATA input is a logical 1, indicating that no pulse has been detected on the servo track within 750 nanoseconds after the first pulse was received, a pulse pair P1, P2 has not been located and the circuit executes block 22 of FIG. 5, providing a 450 nanosecond delay before PAL 22 is again enabled to receive data input (block 0) in search of pulse P1.

Conversely, if after the 300 nanosecond delay provided by block 2 of FIG. 5 the data received by PAL 22 is logical 0, indicating the detection of a pulse, it is thus determined that the pulse detected by block 0 is pulse P1, and the pulse detected at the end of block 2 is pulse P2, because only pulses P1 and P2 are spaced this close in time. In this event, block 3 provides a 450 nanosecond delay. Block 4 provides a 350 nanosecond delay and a W1 output signal, indicating that window pulse W1 should be detected at this time, after which block 5 continues to provide the W1 output signal and also provides a b 450 nanosecond delay. Thus, the W1 output signal is provided by both blocks 4 and 5, thus providing a W1 signal of 750 nanoseconds duration. Block 6 provides a 350 nanosecond delay. Block 7 provides a 350 nanosecond delay and also provides a W2 output signal indicating that window pulse W2 should be detected at this time. Block 8 provides a 450 nanosecond delay and continues to provide the W2 output signal during this time, thus providing a W2 signal of total length of 750 nanoseconds. Block 9 then provides a 350 nanosecond delay. Block 10 then provides a 350 nanosecond delay and also provides a W3 output signal indicating that window pulse W3 should be detected at this time. Block 11 provides a 450 nanosecond delay and continues the W3 output signal, thus providing a W3 output signal having a total length of 750 nanoseconds. Block 12 provides a 350 nanosecond delay. Block 13 provides a 350 nanosecond delay and a W4 output signal. Block 14 provides a 450 nanosecond delay and continues the W4 output signal, thus providing a W4 output signal having a total length of 750 nanoseconds. Block 15 provides a 350 nanosecond delay after which Block 16 enables PAL 22 to receive additional input data. Block 16 also provides a 100 nanosecond delay after which PAL 22 causes the resynchronization of the clock to the rising edge of the next detected pulse, which is be the next P1 pulse. One embodiment of a clock generator which is useful in performing this resynchronization is shown in FIG. 6b and is described later in this specification.

When PAL 22 receives a low data input signal, indicating that a second P1 pulse has been detected, block 17 causes a 450 nanosecond delay after which block 18 provides a 400 nanosecond delay. After this 400 nanosecond delay provided by block 18, block 18 determines if the $\overline{DATA}$ signal just read (by block 16) and the previous data read (and stored in the least significant bit $R_a$ of the shift register formed by PALs 22 and 23) are both equal to zero. In this embodiment of this invention, no two adjacent optional pulses P2 are absent, and thus if block 18 determines that the $\overline{DATA}$ just read and bit $R_a$ are both equal to zero, an error has occurred, and synchronization must be reestablished by beginning again at block 0. To do this, block 18a is executed as the algorithm proceeds from state 18 to state 23, with the $\overline{DATA}$ just read shifted into the least significant bit $R_a$ of the shift register formed by PALs 22 and 23, and all other data ($R_a$-$R_h$) being shifted to its next significant bit ($R_b$-$R_h$), respectively, with the previously stored most significant bit $R_h$ being lost. At the end of this 100 nanosecond delay provided by block 0, and the operation of the circuit is again begun, thereby repeating the search for a pulse pair P1, P2.

On the other hand, if after the 400 nanosecond delay provided by block 18, both the $\overline{DATA}$ signal and the previous $\overline{DATA}$ signal stored as bit $R_a$ of the shift register formed by PALs 22 and 23 are not both logical zeros, an error has not occurred. Block 18b is then executed as the algorithm proceeds from block 18 to block 19, with the $\overline{DATA}$ signal shifted into the least significant bit $R_a$ of the shift register formed by PALs 22 and 23, and all other data ($R_a$-$R_g$) being shifted to its next significant bit ($R_b$-$R_h$, respectively) with the previously stored most significant bit $R_h$ being lost. Block 19 provides a 100 nanosecond delay, and block 20 provides a 450 nanosecond delay, after which block 21 provides a W1 output signal indicating that window pulse W1 is to be received. Block 21 also provides a 350 nanosecond delay, after which the steps defined by block 5 and subsequent blocks are again executed.

In this manner, the operation of one embodiment of this invention in accordance with the steps depicted by the flow chart of FIG. 5 allows the circuit constructed in accordance with this invention to determine the presence of pulse pairs P1, P2 and provide output signals indicating when window pulses W1, W2, W3 and W4 are to be detected. Furthermore, the information provided by the presence or absence of optional pulses P2 is loaded into a shift register and the data provided by a plurality of optional pulses P2 is examined to determine the status of the track being read as either the zero track or a guard band track, as well as determining when the Index position $I_1$ is positioned over the read head.

Figure 6A:
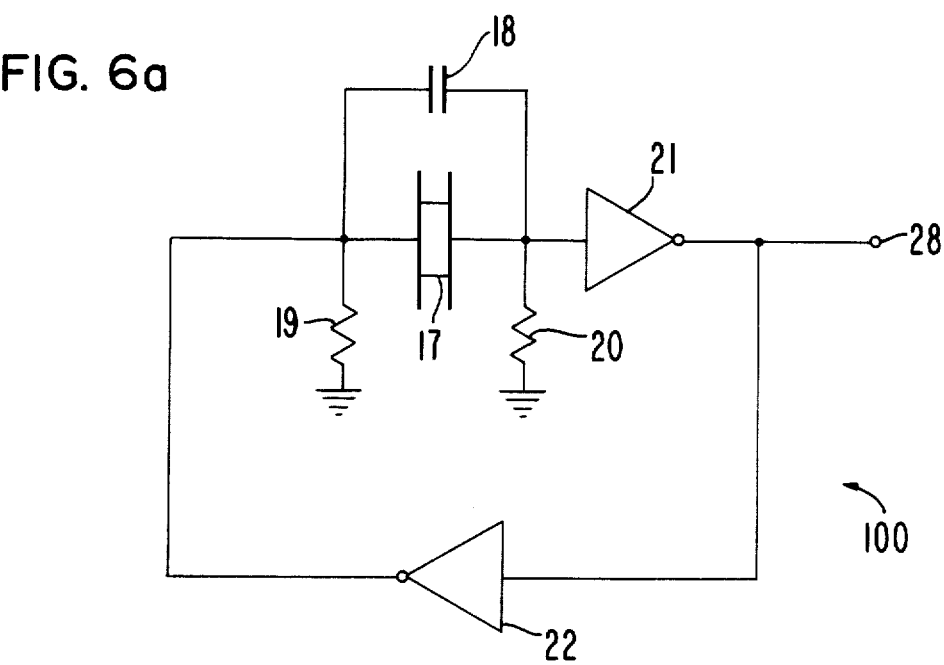
FIG. 6a is a schematic diagram of a prior art clock generator.
Figure 6B:
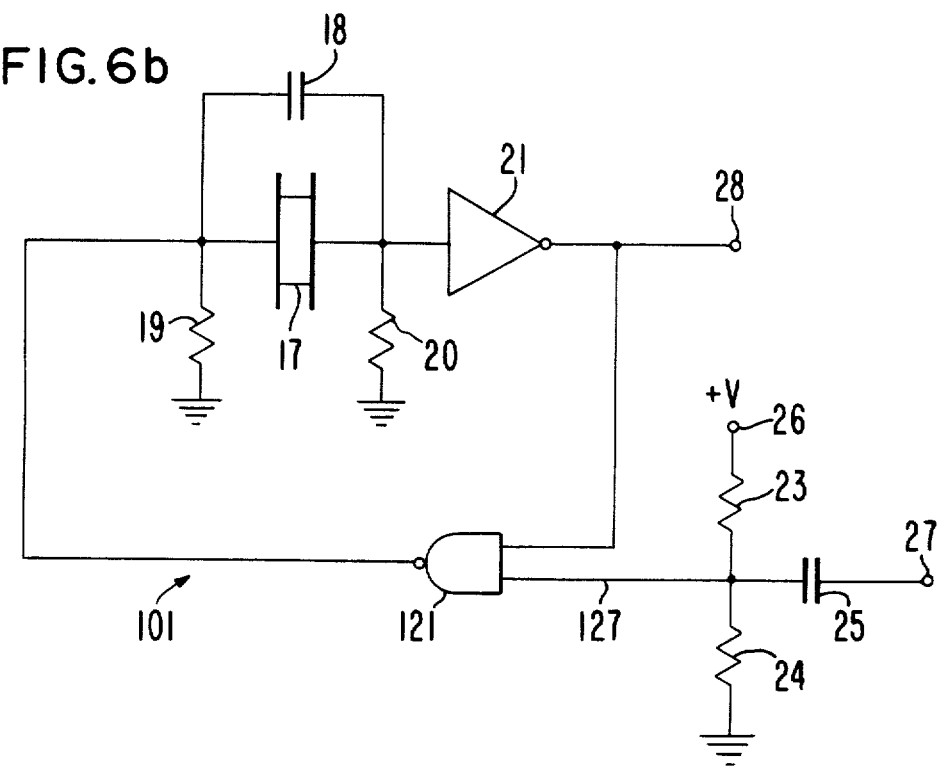
FIG. 6b is a schematic diagram of one embodiment of a clock generator constructed in accordance with this invention.

FIG. 6a shows a prior art crystal oscillator circuit 100. Crystal oscillator circuit 100 includes inverters 21 and 22 and crystal 17 which is physically cut to oscillate at a desired frequency. Resistors 19 and 20 and capacitor 18 serve to load, bias and filter the crystal 17 in a well-known manner. The prior art crystal oscillator circuit 100 provides on an output terminal 28 a substantially square wave signal having a frequency equal to the fundamental frequency of oscillation of crystal 17.

As an additional feature of one embodiment of this invention, the crystal oscillator circuit of FIG. 6b is used in order to periodically resynchronize the square wave clock signal to the pulse stream provided by the servo track being read. Crystal oscillator circuit 101 of FIG. 5b is similar to the prior art crystal oscillator circuit of FIG. 5a with the exception that inverter 22 of a circuit of FIG. 5a is replaced by NAND gate 122 of a circuit of FIG. 5b. Lead 127 of NAND gate 122 serves to receive an enabling/disabling signal which controls the oscillation of crystal oscillator 101. During normal operation of crystal oscillator 101, a high voltage (typically +5 volts) is applied on terminal 27, thus allowing the resistor divider formed by resistors 23 and 24 connected between a positive voltage source +V on terminal 26 and ground to provide a positive voltage (i.e. a logical one of typically +5 volts) on lead 127, thereby enabling NAND gate 122. With NAND gate 122 enabled, crystal oscillator 101 oscillates and provides a substantially square wave clock output signal on output terminal 28. Conversely, when a logical low signal (typically zero volts) supplied to terminal 27, capacitor 25 charges, thus temporarily providing a low voltage on lead 127, thereby disabling NAND gate 122. With NAND gate 122 disabled, (i.e. the output signal of NAND gate 122 is held high) oscillation of oscillator 101 temporarily ceases until capacitor 25 is charged. With capacitor 25 charged, the voltage on lead 127 is again high, thus enabling NAND gate 122. In normal operation of the crystal oscillator 101 of FIG. 5b, the time duration of the low signal supplied to terminal 27 will be very short, and thus capacitor 25 will not normally fully charge prior to the time the signal applied to terminal 27 returns to a high voltage. Thus, a low inhibit signal applied to terminal 27 will cause the cessation of oscillator circuit 101, and a subsequent high inhibit signal applied to terminal 27 will cause the oscillation of oscillator circuit 101 to begin anew. Of importance, when the oscillation of circuit 101 begins in response to the application of a high inhibit signal to terminal 27, a transition of the clock pulse occurs on output terminal 28, thereby synchronizing the clock signal provided on output terminal 28 to the pulse stream being read on the selected servo track, when the inhibit signals applied to terminal 27 of crystal oscillator 101 is provided in response to a pulse read from the servo track.

The embodiments described in this specification are provided by way of example only and are not to be construed as limitations on the scope of this invention. Numerous other embodiments of this invention will become readily apparent to those of ordinary skill in the art in light of the teachings of this specification.

I claim:

1. A servo disk comprising a plurality of tracks each said track storing data relating to the status of said track, said data comprising a plurality of pulse pairs which are read as said servo disk rotates, each said pulse pair including a first pulse and optionally including a second pulse, wherein as said servo disk rotates said first pulse of each said pulse pair is read before said second pulse is read, and wherein the presence or absence of said second pulse is used to store a binary digit.

2. Structure as in claim 1 wherein the information provided by a plurality of said second pulses defines the status of the track being read.

3. Structure as in claim 2 wherein status of the track being read includes status as either a guard band track near an edge of the servo disk or a track signified as a particular reference track.

4. A structure for decoding data stored in the form of pulse pairs on a servo track of a servo disk comprising
means for providing a clock signal of one or more predefined clock periods;
means for determining the data stored by said pulse pair;
means for storing the data stored by a plurality of said pulse pairs;
means for decoding said data stored and providing output signals defining the status of the servo track in response to said data stored.

5. A method for selecting a desired track on a first disk surface, said track containing stored data, comprising the step of selecting a corresponding track on a second disk surface wherein selected tracks on said second disk surface contain information defining the nature of said selected tracks, said information defining being stored as a series of pulses including a plurality of pulse pairs, each said pulse pair having a first pulse and optionally having a second pulse, wherein the presence of or absence of said second pulse provides a binary digit relating to said information defining.

6. The method as in claim 5 wherein a plurality of binary digits provided by the presence or absence of an equal plurality of said second pulses provide a binary word, said binary word providing said information defining.

7. The method as in claim 5 wherein said information defining also defines an index position along said tracks on said second disk surface, said index position corresponding to a like index position on said first disk surface.

8. The method as in claim 5 wherein a selected track on said first disk surface is located by first locating a first track on said second disk surface and secondly locating on said second disk surface a second track removed from said first track by a predefined number of tracks, wherein said second track on said second disk surface corresponds to said selected track on said first disk surface.

9. A method for analyzing a pulse stream from a servo-disk track, said pulse stream comprising a first plurality of pulses forming a second plurality of pulse pairs, each said pulse pair having a synchronization pulse and optionally having a code pulse, said method comprising the steps of:
(a) locating within said pulse stream a first pulse;
(b) determining if a second pulse is present in said pulse stream within a first predetermined time interval after said first pulse is located;
(c) repeating steps a and b if a second pulse is not present in said pulse stream within said first predetermined time interval after said first pulse is located;
(d) if said second pulse is located within said first predetermined time interval after said first pulse is located, locating within said pulse stream a synchronization pulse within a second predetermined time interval after said first received pulse;
(e) determining if a code pulse is present in said pulse stream within said first predetermined time interval after said synchronization pulse is located; and
(f) repeating steps d and e;
wherein the presence or absence of each said code pulse provides a binary digit of information.

* * * * *